(No Model.)
G. E. McVAY.
CORN HARVESTER.
No. 553,564. Patented Jan. 28, 1896.
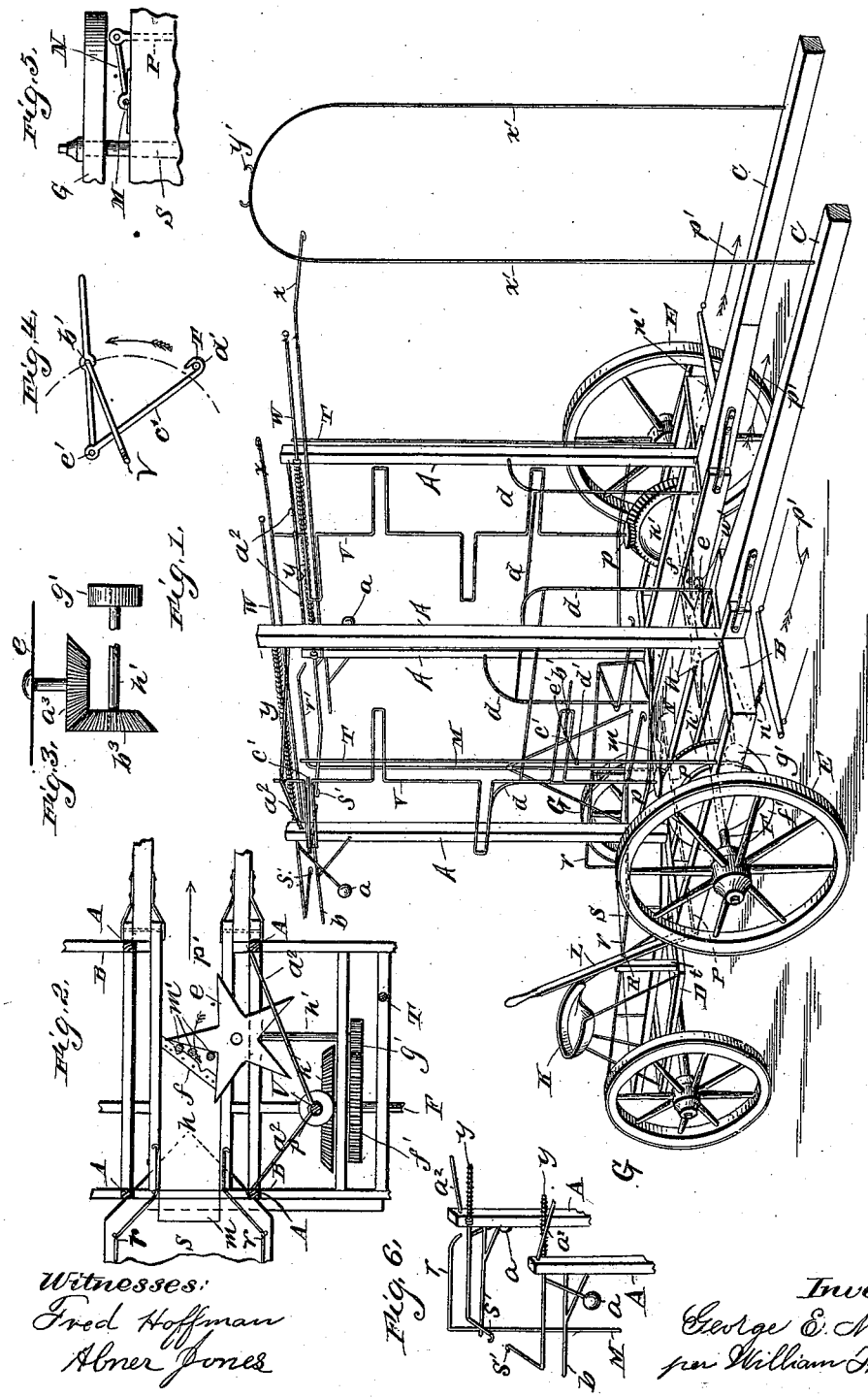
Witnesses:
Fred Hoffman
Abner Jones
Inventor:
George E. McVay
per William F. Sharpe
Atty.

UNITED STATES PATENT OFFICE.

GEORGE E. McVAY, OF CRAWFORDSVILLE, INDIANA.

CORN-HARVESTER.

SPECIFICATION forming part of Letters Patent No. 553,564, dated January 28, 1896.

Application filed October 14, 1892. Serial No. 448,921. (No model.)

*To all whom it may concern:*

Be it known that I, GEORGE E. MCVAY, a citizen of the United States, residing at Crawfordsville, in the county of Montgomery and State of Indiana, have invented a new and Improved Corn-Harvester, of which the following is a specification, reference being had to the accompanying drawings.

The object of my invention is to utilize the power of horses in cutting the stalks of corn and to deposit them in convenient-sized bundles behind the harvester. I accomplish this by means of the mechanism illustrated in the accompanying drawings, in which—

Figure 1 is a general view of my entire machine, and Fig. 2 is an enlarged and downward view of the cutting apparatus and devices for operating the same. Figs. 3, 4, and 5 are details of certain parts.

Similar letters refer to similar parts throughout the drawings.

The framework of the machine consists of the horizontal scantlings B and D and the vertical standards A and $t$, and the whole is supported by two pairs of ordinary wheels E E and G G.

My invention consists of the following essential parts, to wit: the devices for receiving and collecting the cornstalks into bundles of any desired size before dropping the same upon the ground, and the devices for throwing the bundles of cornstalks from the machine.

Having arranged the several parts of my machine under convenient classes as above, I shall now describe the same more in detail and show the manner of accomplishing the work the machine is designed to do.

The arrows $p'$ indicate the direction in which the machine is drawn when doing work. A fixed cutter $f$ is bolted in a horizontal diagonal position to the front edge of the platform-plate $h$. A star-shaped cutter $e$ is placed in a horizontal position, revolving in the direction indicated by the curved arrow and cutting the stalks $m'$ off against the cutter $f$ by a shear-like motion. The cutter $e$ is operated by power from the front pair of wheels E, communicated through the medium of the axle F, multiplying toothed wheels $f'$ and $g'$, axle $h'$, and a pair of beveled cog-wheels $a^3$ and $b^3$ of common form (shown in Fig. 3) placed immediately under the cutter $e$, one of which being attached to the vertical shaft of the cutter $e$ imparts to it a revolving motion. The standards A are arranged so as to leave room for the cornstalks, after being cut off, to be forced backward so as to stand upright on the platform S.

W is a pair of iron rods parallel to the line of motion of the horses, with bent ends $s'$ and knobs at front ends. Said rods glide freely forward and backward in bearings at the tops of the standards A, and through the coiled springs $y\ y$. These rods W are adapted to turn on their axes and have counterpoise-weights $a$ attached to rigid branch rods resting on the top of the supporting-brackets $b$ when in their principal position, which is horizontal.

X X are iron guides adapted to facilitate the free entrance of the cornstalks to the cutters.

At $d\ d$ are fixed iron frameworks on each side of the passage-way formed by the uprights A, and attached to the inner side of said uprights to prevent cornstalks from falling out of place.

T T are vertical rods fixed at their lower ends into the framework B next to the wheels E E.

V V are vertical revolving shafts, having a number of bends or double elbows at right-angles thereto, as shown in the drawings. Horizontal elbows $c'$ with joint $e'$ are attached by an open eye to rod T at $d'$, and by pivotal joint at $b'$ to the point $b'$ of the bent section of shaft V farthest from the axis of V.

$p\ p$ are smaller beveled cog-wheels receiving the shaft V in their axis of rotation and rigidly connected therewith. These small cog-wheels are engaged by the larger beveled cog-wheels $k'$ fixed to the axle of the wheels E E. These elbows or beaters being arranged properly at the sides of the open space between the standards A are arranged so that the beaters from both sides have a quick backward motion over the cutters $e$ and $f$, and thus drive the cornstalks from the cutters back upon the platform S. The cornstalks glide easily over the smooth iron plate $h$ and down over an apron $m$ upon the platform S, as I make the hind pair of trucks lower than the front pair to aid in this work. The hind pair of trucks are connected to the front pair under the plate $h$ in a manner similar to the way in which the pairs of trucks of a four-wheeled farm-wagon are connected.

$r\ r$ is an iron railing to prevent the lateral escape of cornstalks.

M is a vertical rod attached to the framework near the left-hand wheel of the hinder pair of trucks and properly braced to hold in an upright position. It is adapted to turn upon its axis and has horizontal fixed arms $r'$ at the top and N at the bottom.

P is a horizontal rod pivoted to the outer end of arm N and lower end of lever L and passing underneath the platform S. The fulcrum of L is at R.

When a bunch of cornstalks of sufficient size has collected upon the platform S, their upper ends being collected in the receptacle formed by the rods W and bent ends $s'$, the driver upon the seat K moves the upper end of the lever L to his left, which brings the arm $r'$ of the vertical rod M in front of the bunch of cornstalks and thus forces the bent ends $s'$ of rods W to drop down and open out as the bunch is forced backward in a slightly-leaning position and thus allows the bundle to fall to the ground. The lever L is then brought back to its original position by the driver, and the rods W and bent ends $s'$ are automatically brought back to their original position by the action of the spring $y$ and counterpoise-weights $a$.

There are provided boxings and bearings of revolving parts, such as axles, shafts and wheels of any kind, a divided tongue C C forming a sort of shaft, the horses walking upon the outer sides thereof, the stiff bow $x'$ bracing the divided tongue C C and carrying a guide $y'$ at top for lines or checks.

Having now described my invention, I claim—

1. In a corn harvester the devices for collecting the cut off corn stalks into convenient sized bundles before dropping the same from the machine, consisting of a pair of horizontal iron rods W at tops of uprights A with rear ends $s'$ bent at right angles to part W in horizontal position; coiled spring $y$ around the rods W controlling the extent of their forward and backward motion; counterpoise weights $a$, $a$, supported on bracket $b$ adapted with springs $y$, $y$ to return the rods W W to their original position; beaters $c'$ in horizontal position suspended upon pivotal joints on vertical placed iron rod T and shaft V and operated by the revolution of the shaft V with its double elbow projections said beaters being so arranged and operated as to drive the cut off corn stalks backward; all substantially as set forth.

2. In a corn harvester the devices for throwing the bunches of corn stalks from the machine consisting of:—a vertical rod M supported from the frame work near the left hand wheel of the rear pair of trucks, adapted to turn upon its axis having a horizontal bent upper section $r'$ and part N at bottom; horizontal rod P under platform S attached to lever L operated by the driver and so devised and combined that the driver by use of the lever L may cause the arm $r'$ to be brought around in front of the bunch of corn stalks and force said bunch to fall backward on the ground, all substantially as set forth.

GEORGE E. McVAY.

Witnesses:
FRED HOFFMAN,
ABNER JONES.